United States Statutory Invention Registration [19]

[11] Reg. Number: H741

Powell et al. [43] Published: Feb. 6, 1990

[54] DISCRETE COMPLEX CORRELATION DEVICE FOR OBTAINING SUBPIXEL ACCURACY

[75] Inventors: Norman F. Powell, Ellicott City, Md.; Giora A. Bendor, Columbia, Md.

[73] Assignee: The United States of America as represented by the Secretary of the Air Force, Washington, D.C.

[21] Appl. No.: 643,904

[22] Filed: Jul. 12, 1984

[51] Int. Cl.[4] ..... G01S 13/90

[52] U.S. Cl. ..... 342/25; 342/196; 342/378

[56] References Cited

U.S. PATENT DOCUMENTS

| | | | |
|---|---|---|---|
| 3,943,277 | 3/1976 | Everly et al. | 178/6.8 |
| 3,955,046 | 5/1976 | Ingham et al. | 178/6.8 |
| 4,162,775 | 7/1979 | Voles | 244/3.17 |
| 4,244,029 | 1/1981 | Hogan et al. | 364/728 |
| 4,330,833 | 5/1982 | Pratt et al. | 364/515 |
| 4,368,456 | 1/1983 | Forse et al. | 340/146.3 Q |

*Primary Examiner*—Thomas H. Tarcza
*Assistant Examiner*—Linda J. Wallace

[57] ABSTRACT

This invention is directed to an image processing arrangement used to estimate image displacement relative to a reference frame. It comprises a discrete complex correlator, an associated interpolator, and a displacement estimator. The unique nature of the system is its ability to estimate shifts of a fraction of a pixel for sparcely sampled data. This is accomplished by extracting the complex gradients from the gray scale data and in turn correlating the gradients via a discrete complex correlator. The resulting cross correlation function is then interpolated to yield an accurate estimate of the shift. The invention is particularly adapted for use in the autofocus portion of a synthetic aperture radar imaging system.

8 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DISCRETE COMPLEX CORRELATION DEVICE FOR OBTAINING SUBPIXEL ACCURACY

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to synthetic aperture radar imaging systems and more specifically to an autofocus image processing system for estimating image displacement relative to a reference frame.

A large class of problems involving image processing are a result of the need for an accurate registration cability. This task has been alleviated to some degree by the prior art techniques given in the following patents:

U.S. Pat. No. 4,330,833 issued to Pratt et al on 18 May 1982;

U.S. Pat. No. 4,244,029 issued to Hogan et al on 6 Jan 1981;

U.S. Pat. No. 3,955,046 issued to Ingham et al on 4 May 1976;

U.S. Pat. No. 3,943,277 issued to Everly et al on 9 Mar 1976;

U.S. Pat. No. 4,162,775 issued to Voles on 31 Jul 1979;

U.S. Pat. No. 4,368,456 issued to Forse et al on 11 Jan. 1983;

Pratt et al disclose a method and apparatus for digital image processing which operates on dots or "pixels" with an operator matrix having dimensions smaller than a conventional operator. It may be used in the restoration improvement of photographs or other images taken by satellites or astronauts in outer space and then transmitted to earth. Hogan et al disclose a digital video correlator in which a reference image and a live image are digitized and compared against each other in a shifting network to determine the correlation between the two images. In Ingham et al phase shifts are detected and used to follow a target. Correlation type trackers are also disclosed in the Everly and Voles patents. Forse et al teach an image correlator in which a reference representation is updated by a control processor when the correlation of it with a current representation reaches a peak.

In view of the foregoing discussion it is apparent that in the realm of synthetic aperture radar imaging systems there exists a need for development in the area of accurate imaging, particularly if the amount of available data is space. The present invention is directed towards satisfying that need.

SUMMARY OF THE INVENTION

The present invention provides a correlation system with subpixel accuracy for sparcely sampled data using a correlator, interpolator and displacement estimator. The complex gradient correlator is used to correlate the complex gradient data and obtain a pronounced response from the data from the range cells of the radar. Then the interpolator will interpolate the resulting cross-correlation. The displacement estimator receives the interpolation result to yield an accurate estimate of shifts a fraction of a pixel for sparcely sampled data.

It is an object of the invention to provide a new and improved Feature Referenced Error Correction (FREC) autofocusing system but its usefulness is by no means limited to that alone. Any displacement estimate for a gray scale (detected) data relative to a reference frame can be carried out in the same manner as described in this disclosure. When the data is substantially oversampled (as it may be for a direct photograph of a scene) the increased complexity, due to the need to generate complex gradients, cannot be justified and as such other more conventional correlation schemes may suffice. Thus for marginally sampled image the discrete complex correlation scheme offers a substantial subpixel accuracy improvement at the expense of somewhat more demanding processing.

It is a principle object of this invention to provide a new and improved correlation system with subpixel accuracy for sparcely sampled data.

These together with other objects, features and advantages of the invention will become more readily apparent form the following detailed description when taken in conjunction with the accompanying drawing wherein like elements are given like reference numerals throughout.

DETAILED DESCRIPTION OF THE PREFERRED EMBODIMENT

This invention is directed to an image processing arrangement used to estimate image displacement relative to a reference interpolator, and a displacement estimator. The unique nature of the system is its ability to estimate shifts of a fraction of a pixel for sparcely sampled data. This is accomplished by extracting the gradients via a discrete complex correlator. The resulting cross-correlation function is then interpolated to yield an accurate estimate of the shift. The invention is particularly adapted for use in the autofocus portion of a synthetic aperture radar imaging system.

Autofocus is a processing technique that extracts information from the partially processed data to yield an estimate of the error phase present in the data. This, in turn, is used to remove the phase errors from the data prior to its final processing.

A number of autofocus techniques have been developed that successfully estimate the error phase, but with various degrees of processing complexity. Techniques that utilize the fully processed image (in complex form), and that require multiple passes to achieve the final focus, have been successful but cumbersome and therefore not practical in a real-time environment. Other variations of the multipass techniques using iterative search have been successful yet suffer from the same non-real-time constraint.

A different approach is the Feature Reference Error Correction (FREC) technique, which is based on the requirement of a single pass and integration with existing Synthetic Aperture Radar (SAR) processing.

Figure 1:
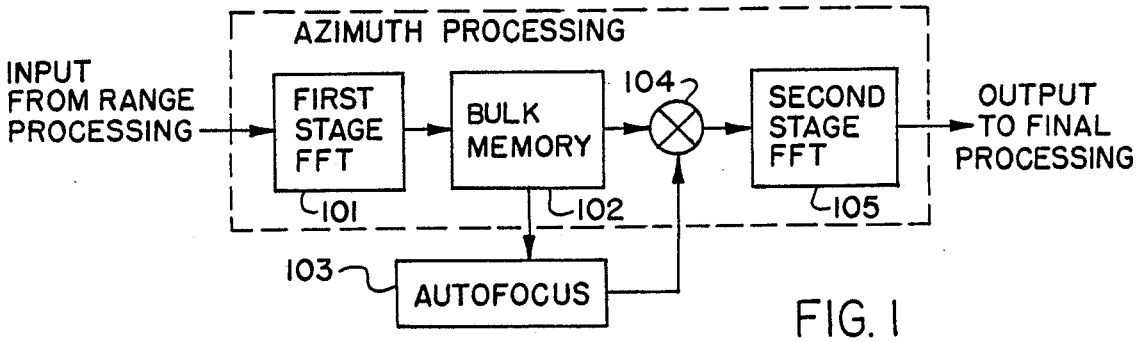
FIG. 1 PRIOR ART
FIG. 1 is an illustration of the use of an autofocus in synthetic aperture radar processing.

FIG. 1 is an illustration of the use of a single pass, feed forward autofocus in use for typical synthetic aperture radar processing. Radar data is input from range processing into the First Stage Fast Fourier Transform (FFT) 101. The output of FFT 101 is the subaperture data which needs to be correlated in a specific manner to yield the error phase which can be removed.

The correlation is done after the data enters the bulk memory 102 by the autofocus 103. The autofocus 103 uses the partially processed data residing in the bulk memory 102 to extract the error phase with the result that the phase errors are removed 104 from the data and sent to the second stage FFT 105 prior to final processing.

The autofocus 102 extracts the error phase by correlating the subaperture data in a specific manner to yield the shifts relative to a reference subframe. These shifts are then reconstructed in a way which regenerates the complete error phase across the full aperture. Starting with data (for a single subframe and a reference subframe) the process involves the following steps:

a generation of the complex gradient of the detected data;

b. line per line complex correlation with an ensemble average over all range cells;

c. interpolating the data block to obtain the shift estimate; and d. estimation of the displacement between the two subframes.

The steps followed by the autofocus in extracting the error phase may be accomplished completely by software on a high speed data processor by following the procedure described below, or the steps may be accomplished by the combination of software and the hardware equivalents depicted in FIG. 2.

Figure 2:
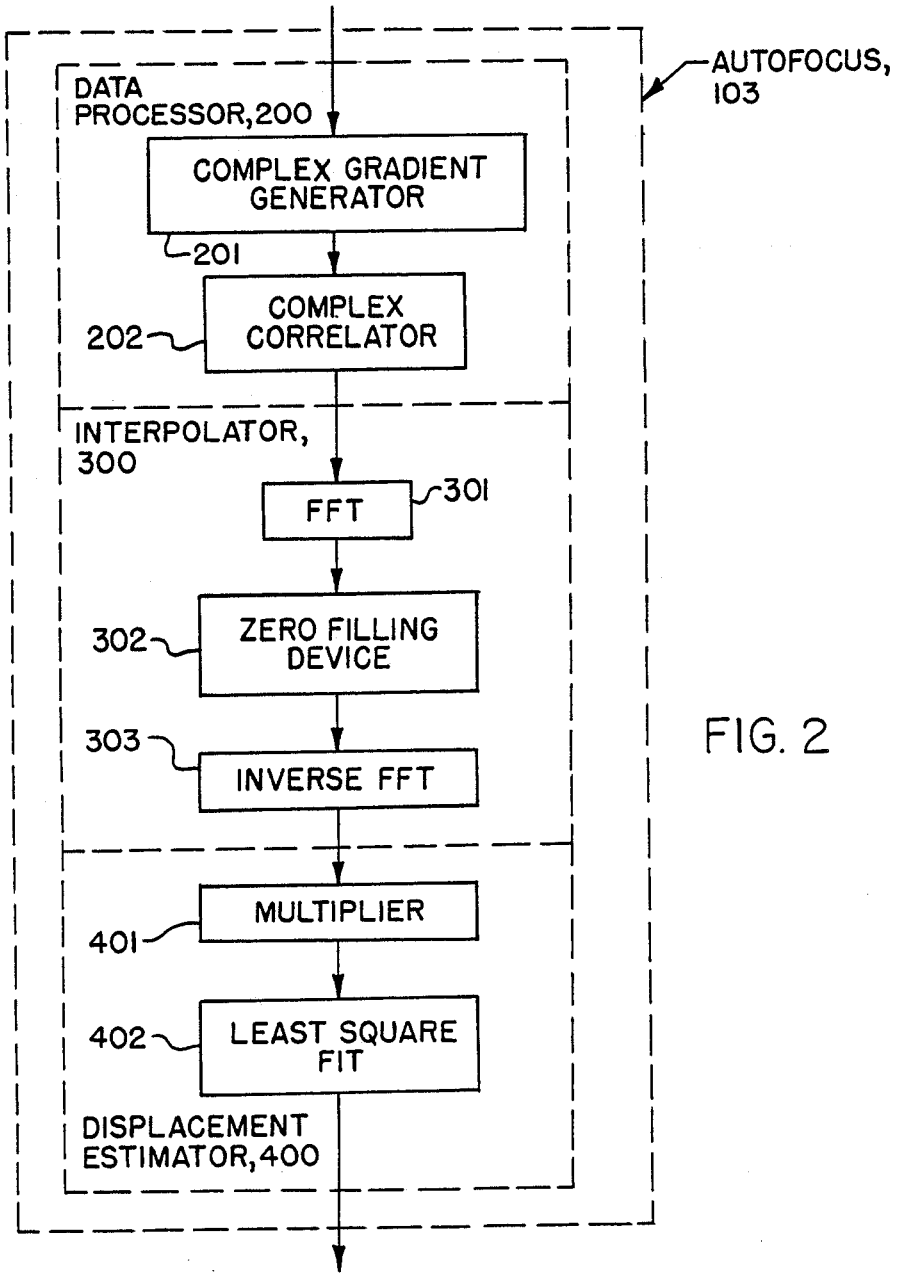
FIG. 2 is a functional block diagram of one embodiment of the present invention.

FIG. 2 is a functional block diagram of one embodiment of the present invention. In FIG. 2, the functions of the autofocus 103 of FIG. 1 are accomplished by the following:

a data processor 200 performs the functions of complex gradient generation 201 and complex correlation 202 (using the process described below);

an interpolator 300 consists of a Fast Fourier Transform (FFT) 301, a Zero Filling Device 302, and an Inverse FFT 303; and the Displacement Estimator 400 consists of a multiplier 401 and either a Least Square Fit 402 or an integrator. These functional hardware blocks perform the process described below which may also be accomplished entirely in software by a high speed data processor.

After the autofocus 103 receives the output of the first stage azimuth FFT 101, the complex data is linear detected, noise clipped to yield the predominant signal (gray scale) and its average intensity is estimated. At this point each subframe is transformed (on a line per line basis) into a complex gradient subframe. This is carried out via a Sobel Window as given in FIG. 3.

Figure 3:
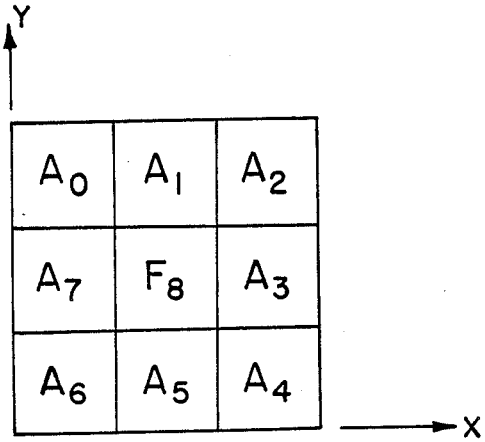
FIG. 3 is an illustration of the Sobel Window.

The Sobel window of FIG. 3 is characterized by the function $F_i$ as defined below in Table 1.

TABLE 1

| |
|---|
| $x = A_2 + A_4 - (A_0 + A_6) + 2(A_3 - A_7)$ |

TABLE 1-continued

| |
|---|
| $y = A_0 + A_2 - (A_6 + A_4) + 2(A_1 - A_6)$ |
| $A = \sqrt{X^2 + Y^2}$ |
| $\phi = \tan^{-1}(y/x)$ |
| $F_i = A_i e^{j\phi_i} = x_i + jy_i$ |

The average power of each subframe (computed in conjunction with the gain distribution across the full aperture) is then used to selected a threshold which in turn is used to reject bad correlation lines. Each line which passes the power threshold is correlated (for 5 to 7 shifts about zero shift) and a running (ensemble) average is used to collapse all of the correlation data over all of the range cells utilized. It is this function which must then be processed further in order to estimate accurately the associated displacement.

Once the intensity gradient is generated a complex set of numbers are obtained for each subframe. Conventional correlation techniques applied to the magnitude of the gradient cannot achieve superior performance to that of conventional intensity correlators. However, when a complex correlator is used to correlate the complex gradient data the response is more pronounced and devoid of ambiguities. The complex correlator is given as:

$$R_{AB}(J) = \frac{2 * Re\left[\sum_{I=1}^{N} A_I B^*_{I-J}\right]}{\sum_{m=1}^{N} A_m A^*_m + \sum_{m=1}^{N} B_m B^*_m}$$

Figure 4:
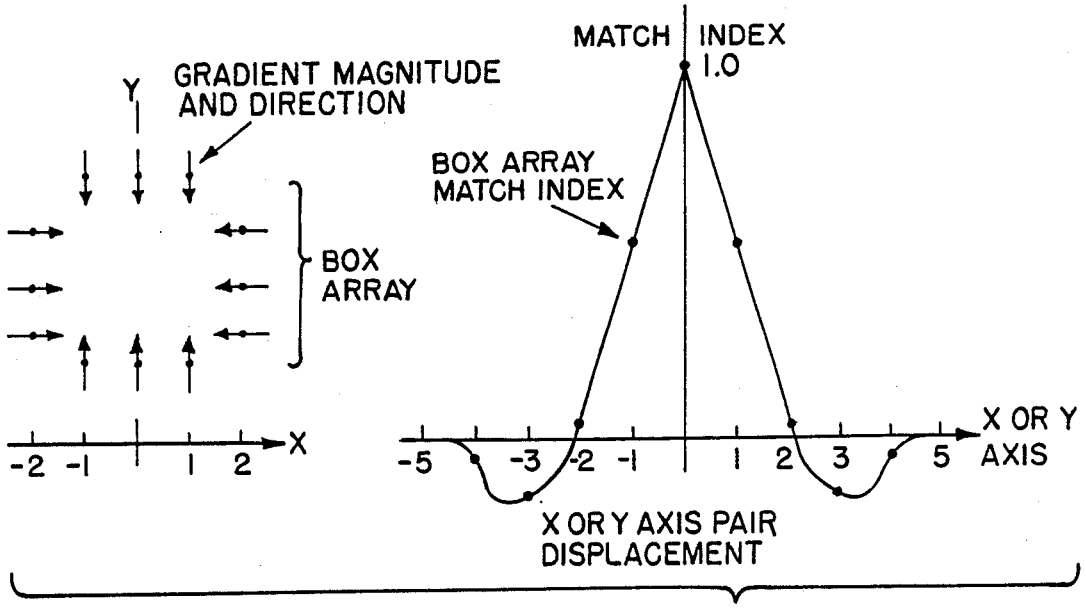
FIG. 4 is a graph of the discrete complex correlator response in two dimensions.

The algorithm computes the cross correlation (more precisely a match index) which is the summation of the gradient vector alignments between scene pairs. Here A is the complex gradient for frame A while B is the complex gradient of the reference frame B. Note that $R_{AB}$ is normalized by the total power and furthermore that when A=B (a match) the resultant due to the match summation of the numerator yields a real positive number. Thus for a perfect match the correlation is positive while the range for $R_{AB}$ is between $-1$ to $+1$. This algorithm has the characteristic of a coherent process in that images that are misaligned produce very low (essentially zero) correlation value. Only when alignment is close does the index have non-zero values. The correlation for correct alignment is the result of coherent summation for intensity gradient pairs which produces a spike like response which peaks at the correct match position. FIG. 4 indicates intensity gradient vector correlation behavior for a discrete intensity pedestal which produces the array of intensity gradients. It is evident that the correlation function (i.e., autocorrelation) is spikey and very rapidly settles to zero.

Figure 5:
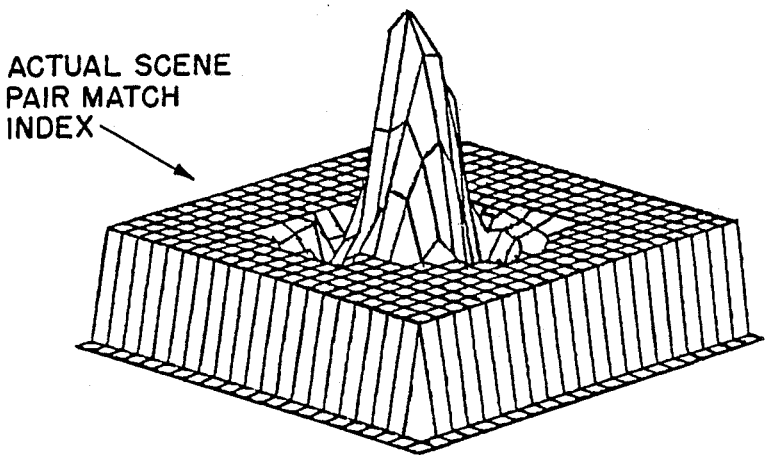
FIG. 5 is an illustration of the discrete complex correlator response in three dimensions.

When the technique is applied to two dimensional scenes the resulting function retains its essential characteristics of unique peak and rapid decorrelation away from the peak. A three dimensional plot of the resulting response is given in FIG. 5 where the sharp peak and the bipolar value of the response function is evident.

It can therefore be concluded that the complex correlator possesses the essential ingredients needed for the FREC processing. The only remaining crucial issue is how to achieve subpixel accuracy for marginally sampled data. This is the subject of the following section.

Figure 6A:
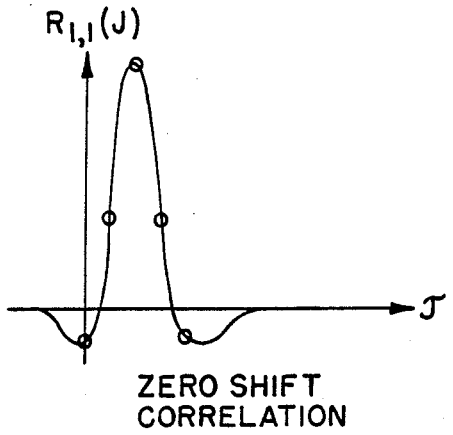
FIG. 6A is the response of the complex correlator to real subaperture data for zero shift correlation.
Figure 6B:
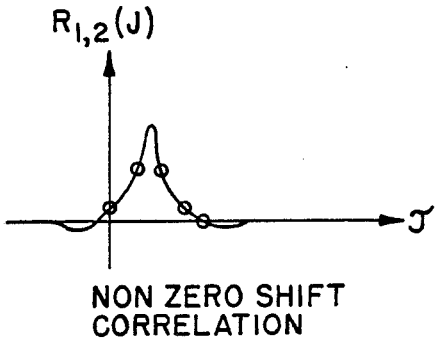
FIG. 6B is the response of the complex correlator to real subaperture data for non zero shift correlation.
Figure 7:
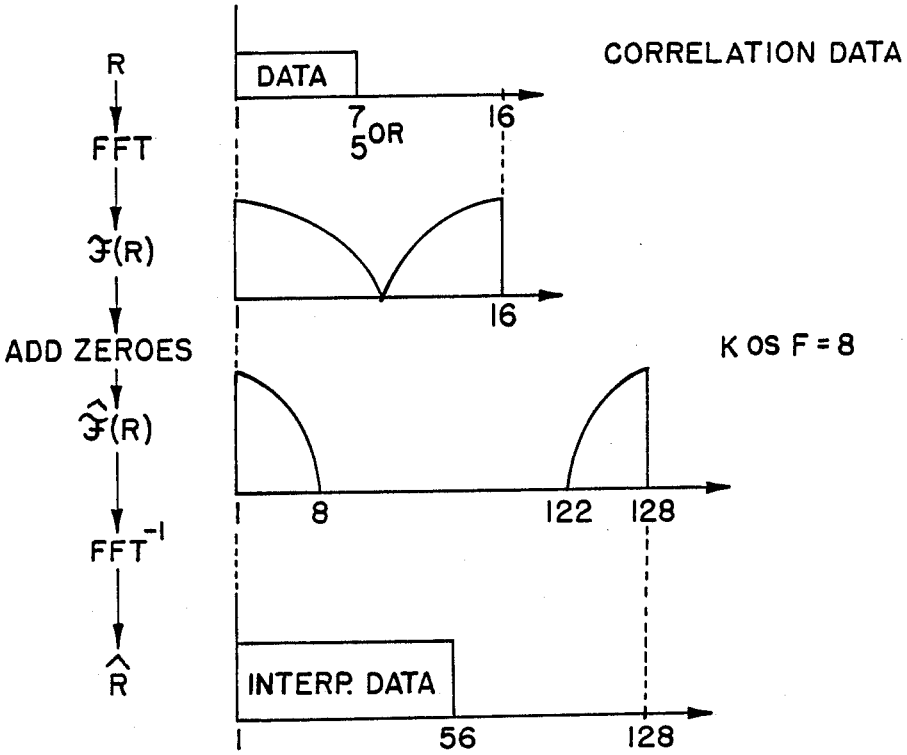
FIG. 7 is a set of charts depicting the interpolation process and its effects on a signal as processed by the three steps of interpolation.

The complex gradient correlation process described above, yields (for realistic data) a very narrow and well defined correlation function (whose positive peak is the only region of interest). This is shown in FIG. 6 for a zero shift correlation (in this case the autocorrelation) and a non-zero shift correlation. It is evident that the correlation function is marginally sampled and as such yields a rather crude estimate of the displacement which is desired to within 1/100 of a pixel.

The interpolation procedure is shown in FIG. 6 where 5 or 7 points of the correlation functions are considered to be the data. This interpolation procedure is also summarized by the block diagrams of FIG. 2 and consists of: doing a FFT 301, adding trailing zeros 302 (as depicted in FIG. 6), then performing an Inverse FFT 303. In FIG. 6, the FFT of the new data block is carried out, zeros are added to its midpoint resulting in a total of 128 pts (for this example of KOSF=8 i.e. $16\times 8=128$).

By adding trailing zeros to the data, it is converted to a convenient binary number. The inverse FFT of this modified spectrum is then carried out to yield the interpolated data block. Selecting the maximum point of this interpolated data block as well as the neighboring 5 points on either side of it, gives a good description of the peak region. At this point a second order LSE fit is carried out on the eleven new data points from which one can easily estimate the local peak (for $ax^2+bx+c=0$, $x_p=-b/2a$). The true peak is then related to the original data by accounting for the oversampling factor as well as the necessary index changes. This interpolation procedure results in an accurate shift estimate.

The shift estimate from the interpolator is next processed by the Displacement Estimator 400 of FIG. 2. First the shift estimate is converted into a phase rate to obtained a displacement history. One way to accomplish this is simply to multiply the shift estimate by a constant as seen in 401 of FIG. 2. The result in turn can be integrated to yield the desired error phase estimate. An alternative to integration is the least square fit 402 which performs a least square estimation to obtain the estimate of the phase error since typically some 32 subapertures are used, a good quality phase estimate is possible.

With the accurate phase error obtained by the autofocus 103, using the procedure described above, the data from the synthetic aperture radar next has this error subtracted from it as shown by 104 of FIG. 1. The result is the removal of phase errors from the data prior to its final processing with the elimination of shifts of a fraction of a pixel for sparcely sampled data.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An autofocus device in combination with a synthetic aperture radar system to extract error phase from detected data, said autofocus device comprising:

a complex gradient generator receiving said detected data from said synthetic aperture radar system and generating a complex gradient from said detected data;

a complex correlator receiving said complex gradient from said complex gradient generator and outputting a line per line complex correlation;

an interpolator receiving said complex correlation from said complex correlator and performing an interpolation to obtain a shift estimate; and a displacement estimator receiving said shift estimate from said interpolator and converting said shift estimate into said error phase.

2. An autofocus device as defined in claim 1 wherein said complex gradient generator is a data processor which generates said complex gradient by performing a Sobel Window process on said detected data.

3. An autofocus device as defined in claim 2 wherein said complex correlator is a data processor which performs said line per line complex correlation by processing said complex gradient with the following algorithm:

$$R_{AB}(J)=\frac{2*Re\left[\sum_{I=1}^{N}A_IB^*_{I-J}\right]}{\sum_{M=1}^{N}A_mA^*_m+\sum_{M=1}^{N}B_mB^*_m}$$

where A is the complex gradient for reference frame A; and B is the complex gradient for reference frame B.

4. A process of correlating detected data from radar range processing to extract an error phase estimate comprising the steps of:

generating a complex gradient of the detected data;

complex correlating said complex gradient overall range cells after said generating step and producing a complex correlation;

interpolating said complex correlation and producing a shift estimate after said complex correlating step; and estimating displacement of said shift estimate to produce said error phase estimate.

5. A process of correlating detected data as defined in claim 4 wherein said generating step comprises processing said detected data with a Sobel Window to produce said complex gradient; and said complex correlating step comprises producing a complex correlation by processing said complex gradient with the following algorithm:

$$R_{AB}(J)=\frac{2*Re\left[\sum_{I=1}^{N}A_IB^*_{I-J}\right]}{\sum_{M=1}^{N}A_mA^*_m+\sum_{M=1}^{N}B_mB^*_m}$$

where A is the complex gradient for reference frame A; and B is the complex gradient for reference frame B.

6. A process of correlating detecting data as defined in claim 5 wherein said interpolating step comprises:

performing a Fast Transform on said complex correlation and producing a Fast Fourier Transform output signal;

adding zeros to said Fast Fourier Transform output signal at its midpoint and producing a convenient binary number; and performing an Inverse Fast Fourier Transform on said binary number to produce a shift estimate.

7. A process of correlating detected data as defined in claim 6 wherein said estimating displacement step comprises:

multiplying said shift estimate by a constant to produce a phase rate; and performing a least square estimate on said phase rate to produce said error phase estimate.

8. A process of correlating detected data as defined in claim 6 wherein said estimating displacement step comprises:

multiplying said shift estimate by a constant to produce a phase rate; and integrating said phase rate to produce said error phase estimate.

* * * * *